Jan. 6, 1959  J. R. FULMER  2,867,207
HEAT RADIATING MEANS FOR BROILER BURNERS
Filed March 8, 1954  2 Sheets-Sheet 1

Inventor
John R. Fulmer
by: Carlson, Pitzner, Hubbard & Wolfe
Attys.

Jan. 6, 1959   J. R. FULMER   2,867,207
HEAT RADIATING MEANS FOR BROILER BURNERS
Filed March 8, 1954   2 Sheets-Sheet 2
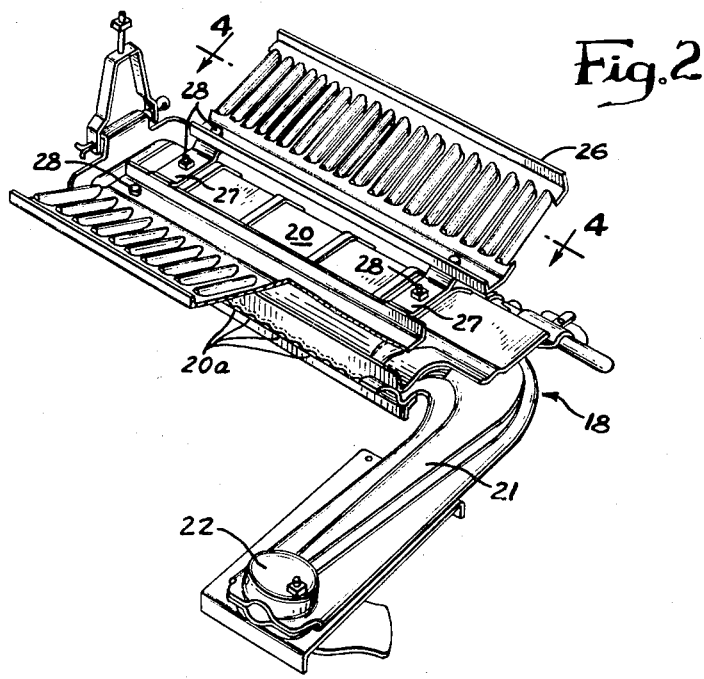
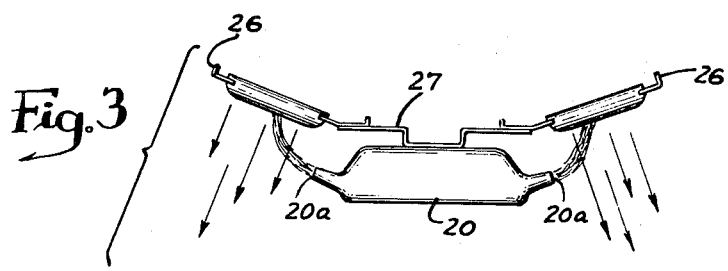
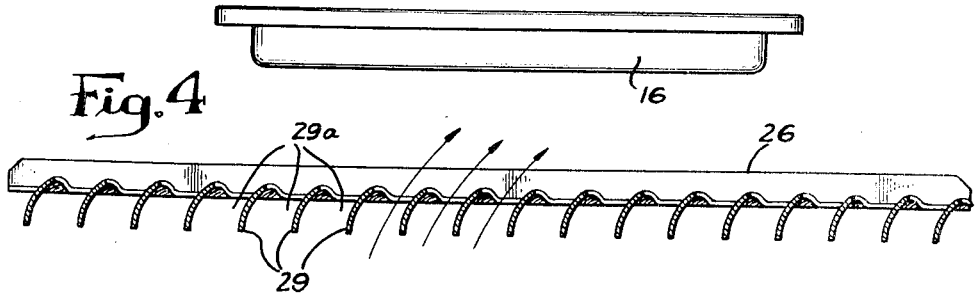
Inventor
John R. Fulmer
by: Carlson, Pitzner, Hubbard & Wolfe
attys.

United States Patent Office 2,867,207
Patented Jan. 6, 1959

2,867,207

HEAT RADIATING MEANS FOR BROILER BURNERS

John R. Fulmer, Kankakee, Ill., assignor to Geo. D. Roper Corporation

Application March 8, 1954, Serial No. 414,740

3 Claims. (Cl. 126—41)

The present invention relates to gas burners for broiler ovens and is more particularly concerned with improvements in the heat radiating characteristics of such burners.

One object of the invention is to provide heat radiating means for a gas burner embodying novel features of construction which enable it to bring the broiler oven more quickly to a desired temperature and to provide more uniform distribution of the heat therein.

Another object is to provide a simple radiating attachment readily fastened on almost any standard broiler oven burner to reflect and radiate heat from the burner flames toward food being cooked in the oven.

Still another object of the invention is to provide heat radiating wings of economical sheet metal construction disposed so as to be heated by flames from a gas burner and to radiate such heat toward food placed in the oven.

A further object is the provision, in an oven having a flue opening for the discharge of gaseous combustion products, of sheet metal radiating means licked by flames from a gas burner to be heated cherry-red, yet so constructed not only as to leave the discharge of combustion products unhampered, but to aid in their direction toward the flue opening.

Other objects and advantages will become apparent as the following description proceeds, taken in conjunction with the accompanying drawings in which:

Fig. 2 is a detailed view, in perspective, of the oven burner and heat radiating means shown in Fig. 1;

Fig. 3 is a diagrammatic front elevation of the oven burner, heat radiating means, and food pan; and Fig. 4 is a longitudinal section, taken substantially along the line 4—4 in Fig. 2, of one of the radiating wings.

Figure 1:
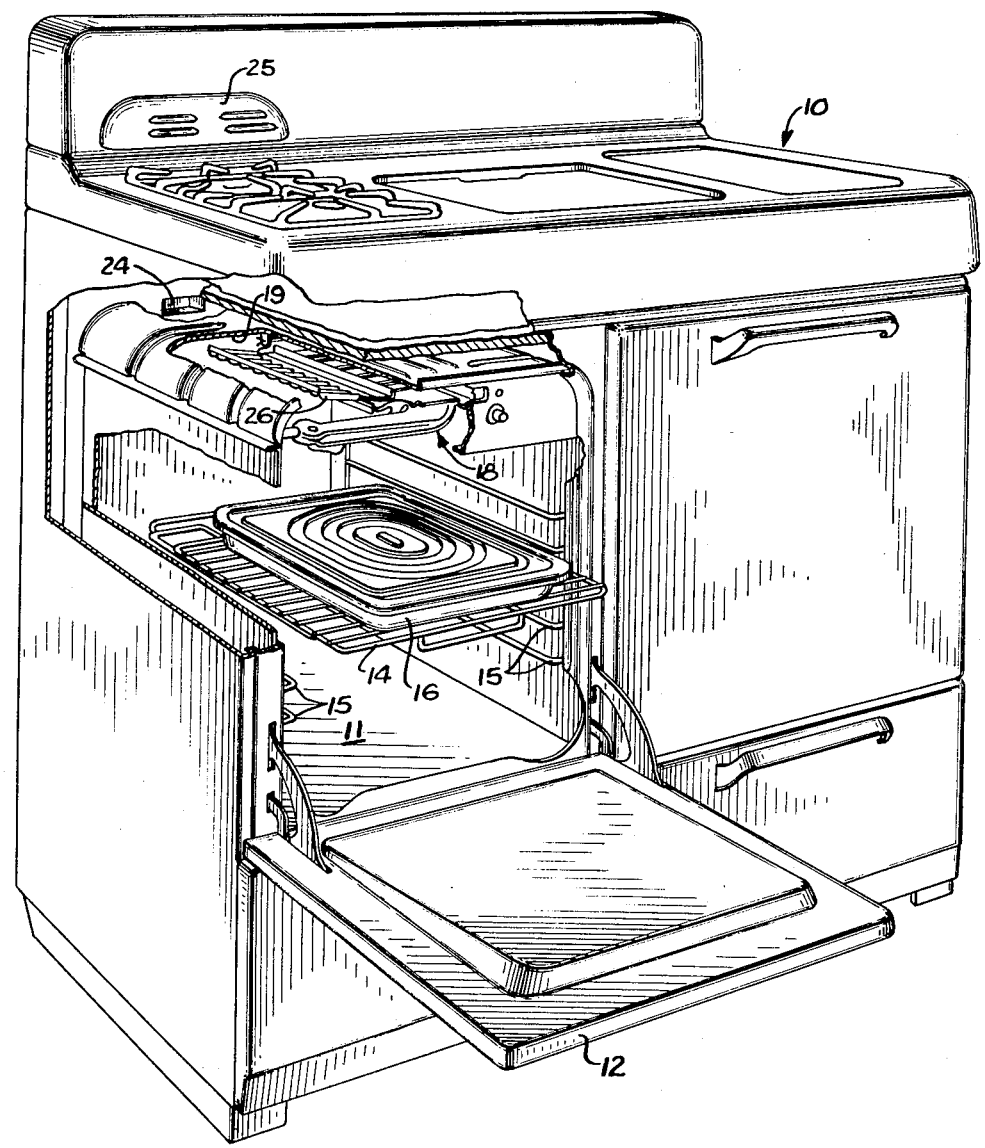
Figure 1 is a perspective view of an exemplary domestic range having an oven equipped with improved heat radiating means embodying the features of the invention.

Referring now to the drawings the invention has been illustrated in connection with a domestic range 10 which, other than the oven and radiating means to be described, may be of conventional construction. The range 10 has a broiler oven 11 on the left, shown with its door 12 open to reveal a support rack 14 which may be placed at selected heights by sliding it onto various sets of vertically spaced channels 15. The rack 14 may receive a food-holding pan, here illustrated as a broiler pan 16.

For broiling and other similar cooking operations, a gas burner 18 is disposed above the rack 14 and pan 16, being suspended in spaced relation from the oven ceiling 19. The burner 18 may be of any suitable construction, that shown here being of the type disclosed and claimed in Reeves United States Patent 2,560,777. Briefly, the oven burner includes a hollow body portion 20 (Fig. 2) which has a series of burner ports 20a along its side and rear edges, the ports opening substantially horizontally, although flame jets emanating therefrom lick upwardly as well as outwardly. The hollow body portion 20 communicates with a mixing tube 21 terminated by a head 22 where combustible gas and air are fed in.

For removing the products of combustion resulting from the burner flames, the oven is provided with a suitable flue system. Convection currents send the warm gaseous products of combustion out through a flue opening 24 formed in the upper portion of the rear oven wall. These gaseous products are diluted with air and discharged through a baffle hood 25 at the top of the stove. One such arrangement is described and claimed in Reeves United States Patent 2,480,044 to which reference may be had for further details.

In accordance with the present invention, heat radiating means are disposed in the oven so as to be brought to a high temperature by substantially direct contact with the burner flames. The radiating means are also oriented to direct radiant heat toward food located in the oven. For this purpose, metal sheets or wings 26 are located above the burner ports to be licked by the flames and brought to a cherry-red heat. The downward radiation from the wings 26 combines with direct radiation from the flames to make more uniform the heat distribution in the oven. As an important feature, the wings are slotted or louvered so as not to impair the transfer of combustion products upwardly and out of the flue opening 24. Further, the louvers are formed by means which aid in directing the combustion products toward the flue opening, while at the same time presenting a substantially unbroken effective radiating surface faced toward the broiler pan 16.

As shown in this instance, the wings 26 are stamped from sheet stock of stainless steel, being provided with inner flanges received on common brackets 27 which in turn are secured to the burner body 20 by fastening bolts 28. The wings are thus held superposed above and inclined upwardly from the series of ports 20a on each side of the burner body 20. As indicated diagrammatically in Fig. 3 the wings 26 are disposed so as to be licked by flames emanating outwardly and upwardly from the burner.

In order to permit the gaseous products of combustion resulting from the burner flames to rise upwardly and drift rearwardly through the flue opening 24, each of the wings 26 is provided with a series of slits or louvers formed by fins 29 (Fig. 4) which are inclined upwardly and rearwardly, leaving openings 29a. As a result, the products of combustion not only may pass freely through the openings 29a of wings 26 (as shown by the flow arrows in Fig. 4) but the inclination of the fins 29 causes the latter to positively direct the gaseous combustion products rearwardly toward the flue opening 24. It will be perceived that the provision of the louver fins 29 directs the gaseous combustion products rearwardly toward the flue opening, but nevertheless each opening 29a has such a small cross section when viewed from beneath the wing that the latter leaves each wing with substantially the same effective radiating surface area as it would have if it were perfectly flat. Thus, when licked by the burner flames and heated to a glowing red, the wings 26 radiate heat from a wide area, directing it down toward the bottom of the oven and toward any food therein.

From the foregoing, it is believed that the construction and advantages of the present radiating means will be clear. By way of brief summary, it may be mentioned that the highly effective radiating means provided may be economically formed, as by a stamping operation, from sheet metal, preferably a metal such as stainless steel which may be repeatedly heated to a glowing red condition. Thus stamped, the sheet metal radiating wings 26 are very simply and easily mounted above the ports of a burner, as for example by means of the brackets 27. In use, the radiating wings direct radiant heat downwardly toward food being cooked in the oven, such heat radiations being combined with direct radiation from the oven flames to produce a more uniform temperature distribution within the oven. Ordinarily, it would not be possible to mount broad flat sheets of metal directly above the burner ports without impairing the flame paths and the subsequent travel of gaseous products of combustion. But by virtue of the slotted and louvered arrangement shown, including the upwardly and rearwardly inclined fins 29, such products of combustion may pass freely upwardly and, in fact, are positively directed rearwardly toward the flue opening.

I claim as my invention:

1. In an oven having a broiler pan horizontally disposed therein and a flue opening in its upper rear wall, the combination of a gas burner disposed horizontally above the broiler pan and in spaced relation beneath the oven ceiling, said burner having a row of lateral ports opening substantially horizontally to support flames of combustible gases fed to the burner, with a metal sheet disposed above said ports and inclined upwardly from the ports in position to be licked by flames emanating from the burner, said metal sheet having a plurality of louver slits defined by fins inclined upwardly and rearwardly to direct products of combustion from said flames toward the flue opening, the metal sheet thereby being heated by the flames to radiate heat downwardly without interfering substantially with said flames or the discharge of products of combustion.

2. The combination in an oven having a food pan horizontally disposed therein and means defining a flue opening in the upper portion of one wall of the oven, of a gas burner mounted horizontally above said pan but spaced beneath the oven ceiling, said burner having two series of ports disposed in a row running one direction and opening substantially horizontally in a second direction normal to the first, and a pair of stainless sheet steel wings each disposed above one of said series of ports and inclined upwardly therefrom to be licked by flames emanating from the ports, said wings having a plurality of louvers defined by fins inclined upwardly toward said flue opening to direct products of combustion toward such opening, said wings thereby being heated cherry-red by the flames and radiating heat from a substantially unbroken surface toward said food pan.

3. For use as an attachment in a broiler oven having a top flue opening and having a horizontally disposed burner with flame ports opening substantially horizontally along one side, the combination of a heat radiating wing of sheet metal having a series of longitudinally spaced louvers formed by inclined metal fins, and a bracket for attaching said wing to the burner with the fins inclined toward the flue opening and in superposed relation to the ports to be licked by flames emanating from the latter, said wing thereby being heated to radiate heat downwardly while gaseous products of combustion from the flames pass freely through said louvers toward the flue opening.

References Cited in the file of this patent

UNITED STATES PATENTS

| | | |
|---|---|---|
| 1,907,077 | Maul | May 2, 1933 |
| 2,570,771 | Conron | Oct. 9, 1951 |
| 2,720,258 | Brodbeck et al. | Oct. 11, 1955 |

FOREIGN PATENTS

| | | |
|---|---|---|
| 515,018 | Great Britain | Nov. 23, 1939 |
| 515,034 | Great Britain | Nov. 23, 1939 |